United States Patent [19]

Grudzinski

[11] 4,162,417

[45] Jul. 24, 1979

[54] ELECTROMECHANICAL ESCAPEMENT

[75] Inventor: Richard Grudzinski, La Chaux-de-Fonds, Switzerland

[73] Assignee: Universo S.A., La Chaux-de-Fonds, Switzerland

[21] Appl. No.: 839,367

[22] Filed: Oct. 4, 1977

[30] Foreign Application Priority Data

May 2, 1977 [CH] Switzerland ........................ 5451/77

[51] Int. Cl.$^2$ ............................................ H02K 7/06

[52] U.S. Cl. ..................................... 310/21; 58/23 D

[58] Field of Search ....................... 310/21, 22, 29, 32; 58/23 D

[56] References Cited

U.S. PATENT DOCUMENTS 658,997 10/1900 Perret .................................... 310/21

1,653,888 12/1927 Chaplin ................................ 310/21

*Primary Examiner*—Donovan F. Duggan

*Attorney, Agent, or Firm*—Young & Thompson

[57] ABSTRACT

The present invention has as an object the provision of an electromechanical analogic display device for electronic chronometers, comprising at least an electromagnetic motor controlled by an electrical impulse of short duration. The attractive influence of the latter distorts a spring, very rapidly storing the produced energy to release it in the form of kinetic energy and driving a toothed wheel coupled to the analogic display while on the other hand this electromagnetic motor activates a locking system permitting the passage of a single tooth per cycle, and thus assures for said device immunity from mechanical shocks and most particularly from tangential accelerations.

5 Claims, 7 Drawing Figures

ELECTROMECHANICAL ESCAPEMENT

Various electromechanical systems for analogic display for electronic chronometers, have been used.

The electromechanical device according to the invention comprises an improvement in this field.

This device is simple in principle and easily miniaturized.

Its manufacture is inexpensive, from known materials.

Its useful torque may be large.

The electrical control impulse is short, in certain cases less than a millisecond, which enables the use of higher instantaneous current with greater motor torque, while achieving acceptable efficiency.

The device according to the invention offers immunity from parasitic shocks and above all from angular accelerations.

The present invention has as an object the provision of an electromechanical analogic display device for electronic chronometers characterized by the fact that it comprises at least an electromagnetic motor controlled by an electrical impulse of short duration, that the attractive influence of the latter distorts a spring, very rapidly storing the produced energy to release it in the form of kinetic energy and driving a toothed wheel coupled to the anologic display while on the other hand this electromagnetic motor activates a locking system permitting the passage of a single tooth per cycle, and thus assures for said device immunity from mechanical shocks and most particularly from tangential accelerations.

The annexed drawings illustrate schematically and by way of example three possible embodiments of the electromechanical analogic display device.

It is to be noted that the hour or minute display may be produced directly, for example, by a toothed wheel without intermediate means.

The small size of the motor and its very thin design (less than 2 mm) permits assembling two motors one on the other and directly driving the minutes, for example one stroke per minute, as well as the hours, for example, one stroke per hour, and this without any risk, the device having excellent immunity against shocks and tangential accelerations.

A portion of the device may be used to provide an acoustic alarm without disturbing the display device.

It is possible to interpose at a reduced level a train of electrical waves, whose carefully selected frequency, resonantly drives the couple motor/motor spring. The sound source created by the resonance is utilizable as an acoustic alarm.

Figure 1A:
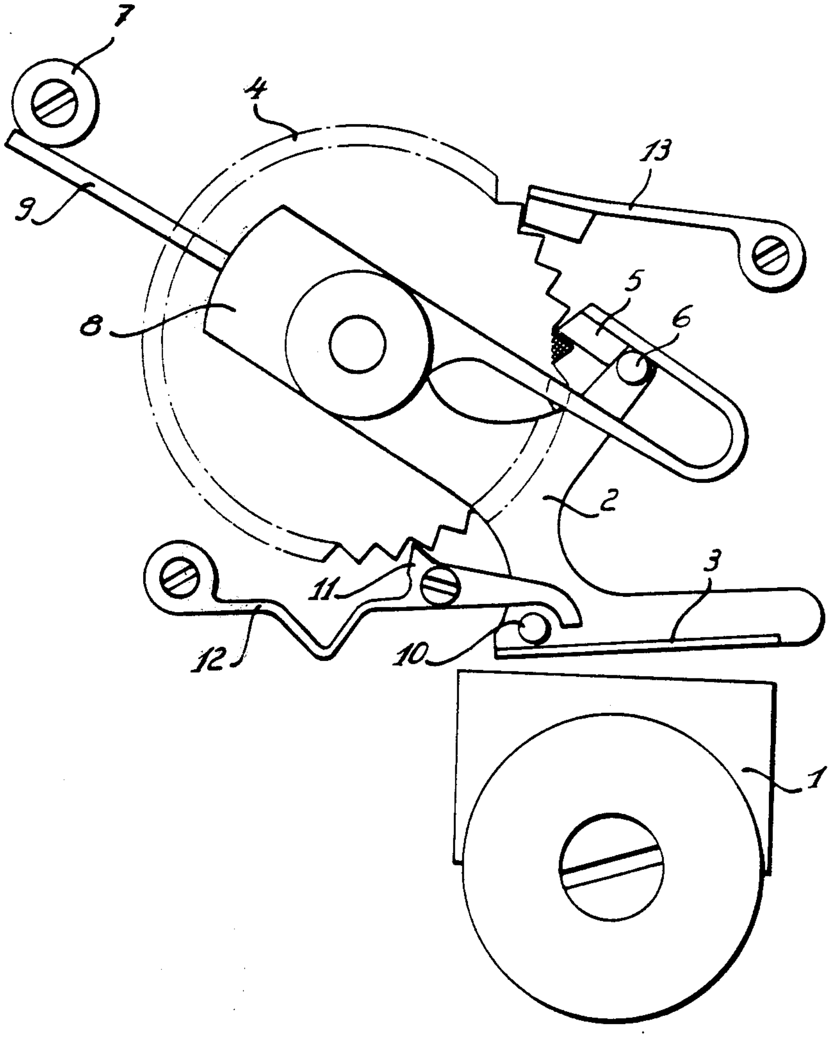
FIGS. 1A, 1B and 1C show a first embodiment of mechanical blockage at three points in the cycle of operation.
Figure 1B:
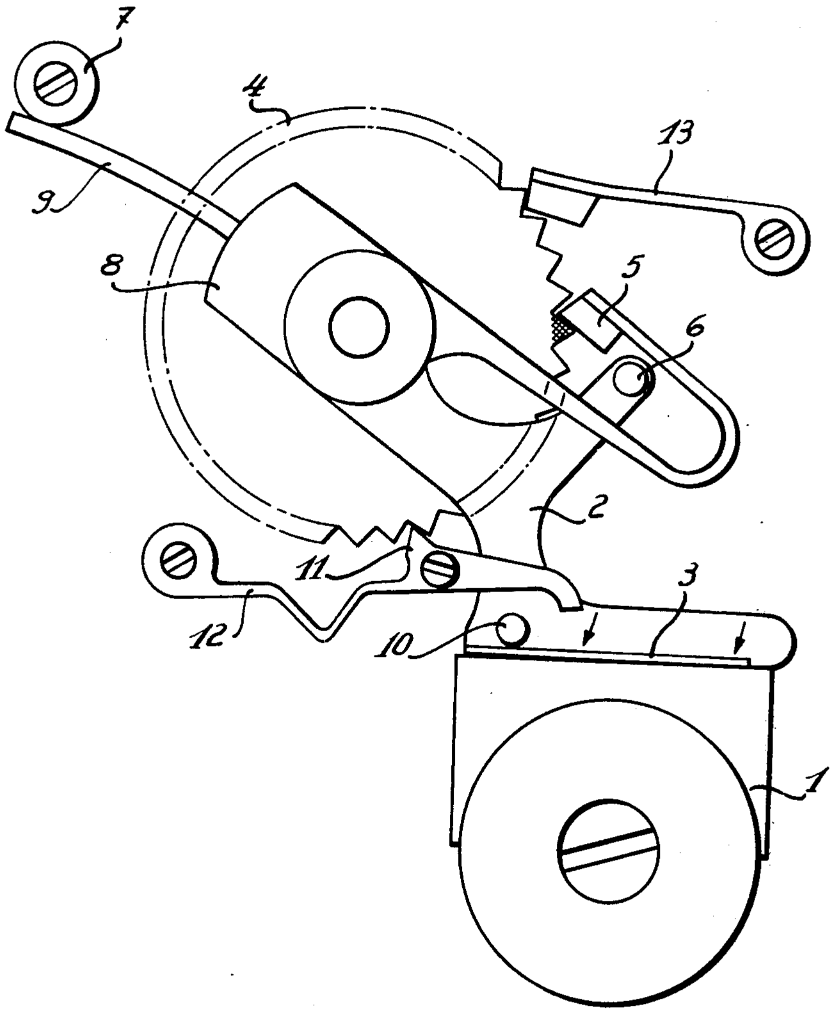
Figure 1C:
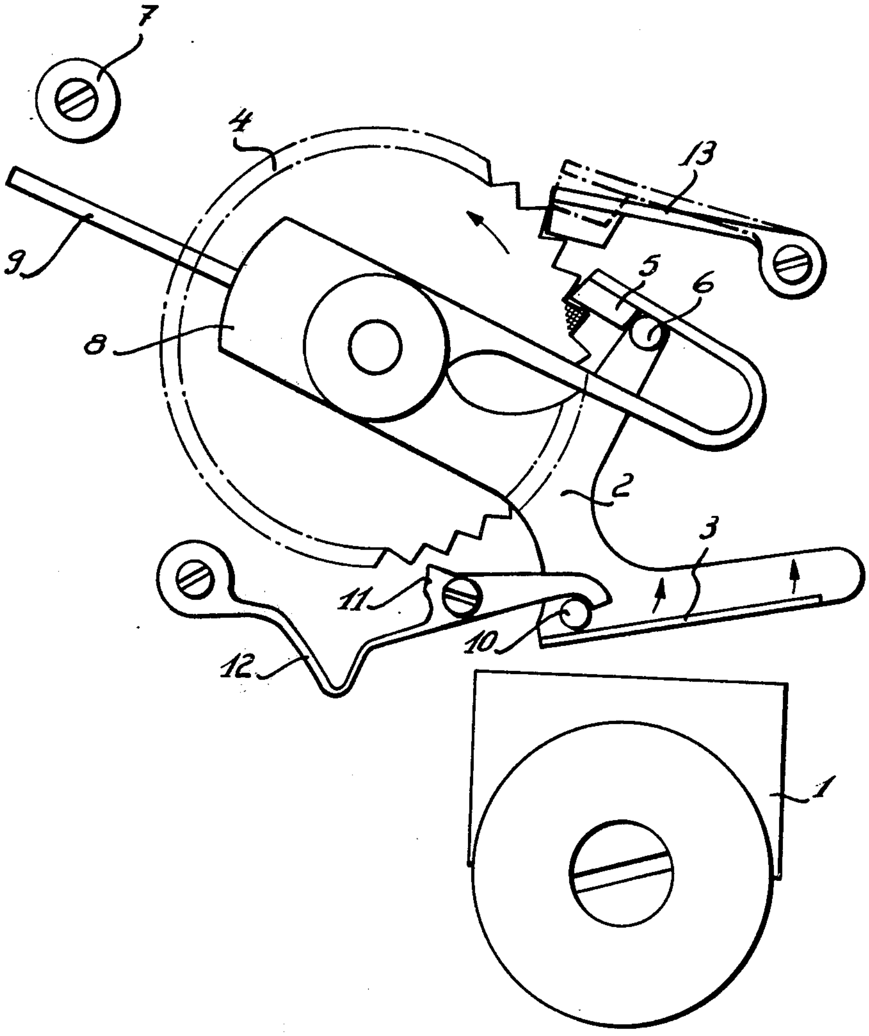

The first embodiment of the device illustrated in FIGS. 1A, 1B and 1C comprises an electromagnetic plate motor 1, a movable support 2, a movable plate 3 of magnetic material, a toothed wheel 4 for the display of information, a driving pawl 5, a drive lug 6, a detent 7 for receiving the drive spring, an anchoring block 8 for the drive spring, a drive spring 9, a drive lug 10 for a locking pawl 11, a return spring 12 and an indexing assembly 13 comprising a pawl and spring.

The movable support 2 may be molded of plastic integrally with the sub-assemblies 5/6/8 and 10. At rest the pawls 5, 13 and 11, for driving, indexing and locking, are engaged with the teeth of the wheel 4. The drive spring 9 is free and the magnetic plate 3 is disengaged from the pole pieces of the electromagnetic motor 1 with a predetermined clearance therebetween (the drive spring may be constituted by a leaf, a wire, a spiral or any combination of these elements).

When the drive pulse is received by the motor 1 (FIG. 1B), the plate 3 is drawn toward the pole pieces of the motor thus moving the movable piece 2. The drive spring 9 is flexed by the abutment 7 thus storing for a time corresponding to the duration of the electrical impulse, the mechanical energy necessary for operation of the device. The pawls 11 and 13 for locking and indexing remain in a position to counteract all parasitic mechanical shocks.

The electrical impulse having ended, the attractive force of the plate 3 becomes zero and the drive spring 9 releases its energy by driving the movable support 2 through block 8. This spring 9 returns to its initial position but the movable piece 2 continues its path until all its kinetic energy is absorbed (FIG. 1C).

During this movement it drives the pawl 11 through the drive lug 10 which frees the toothed wheel 4 and permits the device to operate, while bending the return spring 12. The kinetic energy stored by the movable support 2 being spent, the spring 12 returns the assembly of the device to its initial position by means of the lug 10. The device is again locked and ready to operate (FIG. 1A).

This locking system operates like a mechanical monostable. Various modifications may be made in the configuration of the plate 3 as well as in the pole pieces of 1, as it can be shown in FIG. 1A. Plate 3 is modified so that it advances like a rectangular core, penetrating directly into a recess provided between the pole pieces of 1.

The material of 3 may be magnetized so as to have a lateral polarization, in this case, the direction of lateral magnetization of the plate 3, relative to the direction of the field created by the controlled electrical impulse in the gap of the motor 1 will determine a motor movement of attraction or repulsion.

Figure 2A:
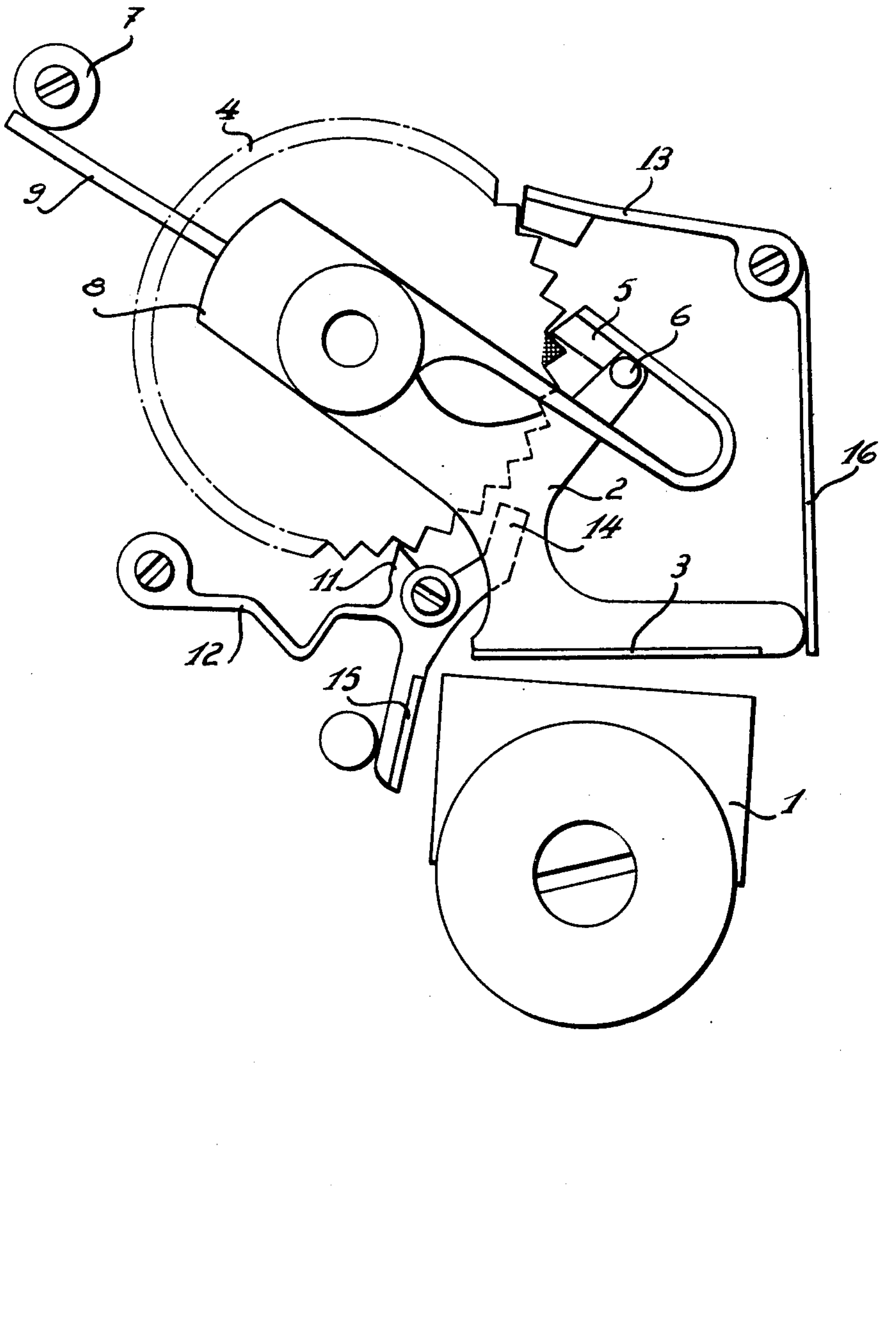
FIGS. 2A, 2B and 2C show a second embodiment of the magneto-mechanical blockage.
Figure 2B:
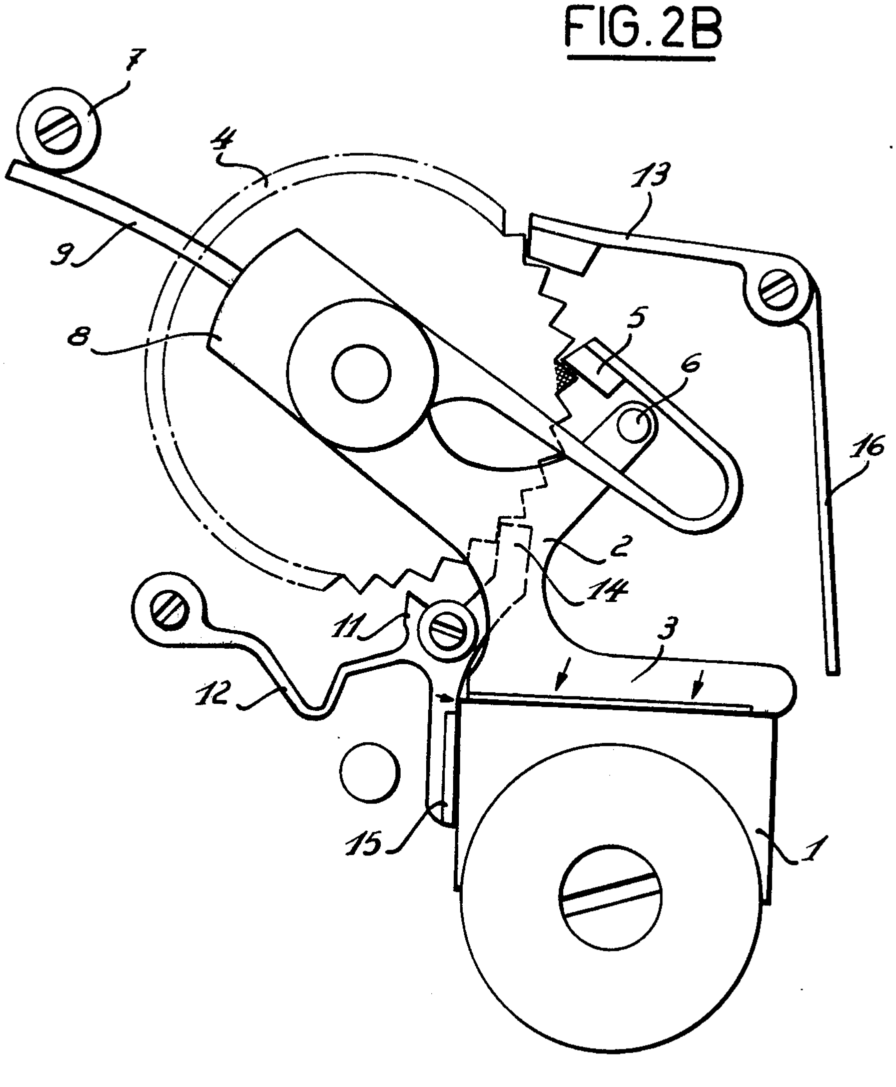
Figure 2C:
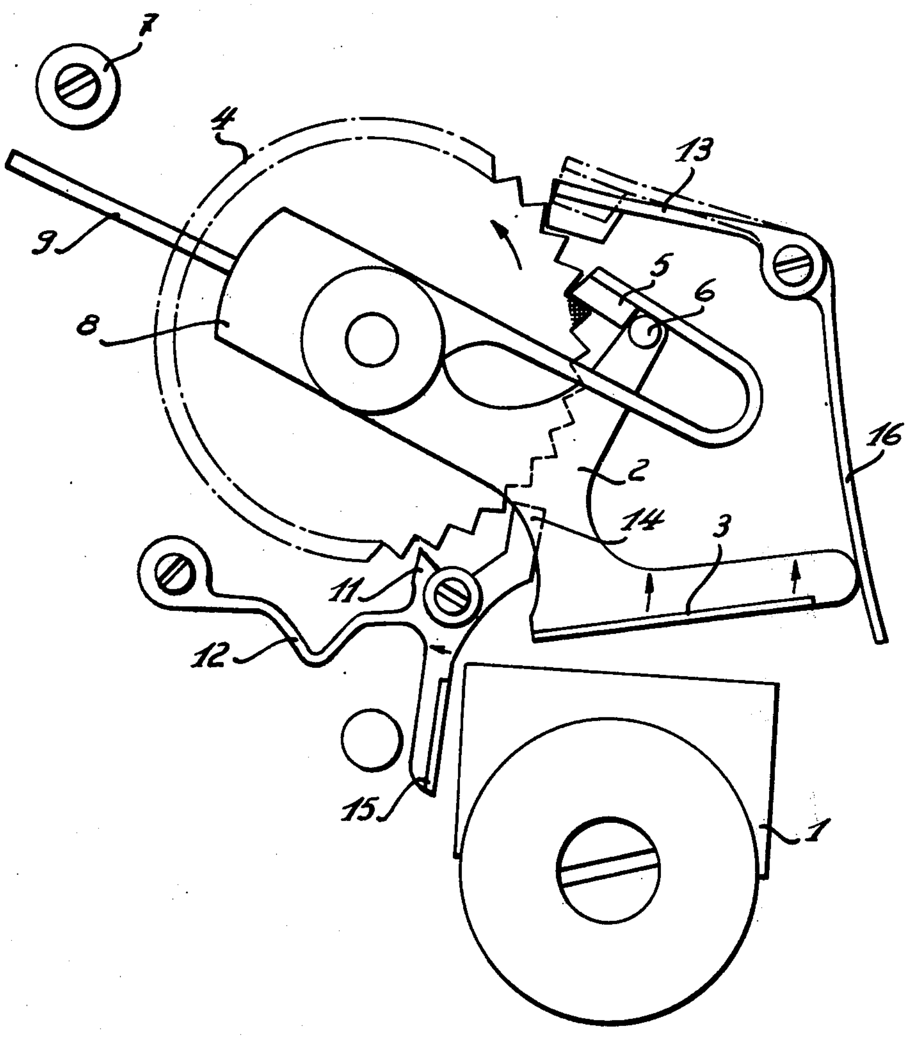

FIGS. 2A, 2B and 2C illustrate another embodiment whose locking means is magneto-mechanical. This embodiment comprises, in addition to that illustrated in FIG. 1, a "single tooth" detection pawl 14 of the locking system, a memory lever 15 of the electrical control with its movable plate of magnetic material and a return spring 16.

At rest (FIG. 2A) the locking pawl 11 is lodged in the teeth of wheel 4, as well as the pawls 5 and 13 for driving and indexing. The springs 9 and 16 for drive and return are in a free position. The magnetic plates 3 and 15 are spaced from the pole pieces of the electromagnetic motor 1 by a predetermined gap. When the control impulse is received by motor 1, plate 3 is drawn toward the pole pieces of motor 1 thus driving the movable piece 2. The drive spring 9 is flexed by the abutment 7 thereby storing during the duration of the electric impulse, the energy necessary for operation of the device (FIG. 2B).

During this time, the magnetic plate of the memory lever 15 is drawn by the pole pieces of 1. It enters into contact with the latter and is magnetized under the influence of the magnetic field, and then remains in contact after the disappearance of the electrical impulse. Pawl 11 upon movement of 15 unlocks the toothed wheel 4 and the "single tooth" detection pawl penetrates the teeth of 4 in a detection position. At this precise moment, two modes of operation may occur:

(a) The device operates normally without external disturbance.

When the electrical impulse is over, the drive spring 9 straightens out thus driving the movable support 2 by means of block 8. This spring returns toward its initial position while the movable support 2 continues, driven by the accumulated kinetic energy.

During this tangential movement, it actuates the driving and indexing pawls 5 and 13, which advance the toothed wheel 4 by one tooth, while flexing the return spring 16.

The kinetic energy of 2 being spent, the spring 16 returns the assembly of the equipment to its initial position. At the same time, while the toothed wheel turns one tooth, pawl 14 is pushed back by the teeth, the plate of lever 15 separates from the pole pieces of 1 and de-magnetizes, spring 12 returns with the help of the movement of 14 the locking pawl 11 into the following tooth thus locking the toothed wheel 4 (FIG. 2C).

(b) The device receives a parasitic shock.

If a parasitic shock happens before the drive spring 9 of the device can release its energy, and the toothed wheel 4 moves by one tooth under the influence of a parasitic angular acceleration, the pawl 14 is pushed back by the teeth, the plate of lever 15 separates from the pole pieces 1 and de-magnetizes (air gap and weak coercive field). Spring 12 returns, with the help of the movement of 14, the locking pawl 11 into the following tooth, ensuring a positive blocking, until the next electrical impulse. The action of drive spring 9 becomes, in this case, of no effect on the device.

The locking system operates as a mechanical bistable with two stable positions.

It is to be noted that the locking pawl 11 may be replaced by a brake pad, whose bearing surface may be soft or toothed. It is to be noted that the toothed wheel can advance one and only one tooth per electrical impulse no matter what the drive mode, whether by recovery of electromagnetic energy or by angular acceleration due to a parasitic mechanical shock, which ensures to the described apparatus, an immunity to parasitic mechanical shock, acting in the direction of the rotation of the wheel 4.

On the other hand, a very large and long-lasting parasitic mechanical shock, giving rise to an angular acceleration opposite to the indexing movement of the wheel 4, can completely cancel the indexing of one step by blocking the movable piece 2. This drawback can be avoided with an electronic sequential logic system, which delivers a number N of electrical drive "motor" pulses until the wheel 4 indexes by this step.

During the "single tooth" detection of pawl 14, the plate of the lever 15 previously magnetized by a "motor" drive impulse separates from the pole pieces of 1 and demagnetizes thereby creating an abrupt variation in the magnetic flux ($d\phi/dt$), which induces an impulse voltage within the motor winding. This induced impulse voltage, indicates electrically the advance of one step of the toothed wheel and inhibits the electronic sequential logic system. The feed of the motor drive impulse needed for indexing one step is then stopped.

At the same time, the sequential logic system returns to zero, awaiting the next operating order proceeding from the frequency generator.

The sequential logic system, connected to the magneto-mechanical blocking system ensures for the described device, complete immunity from mechanical shocks as well as from positive or negative angular accelerations.

Figure 3:
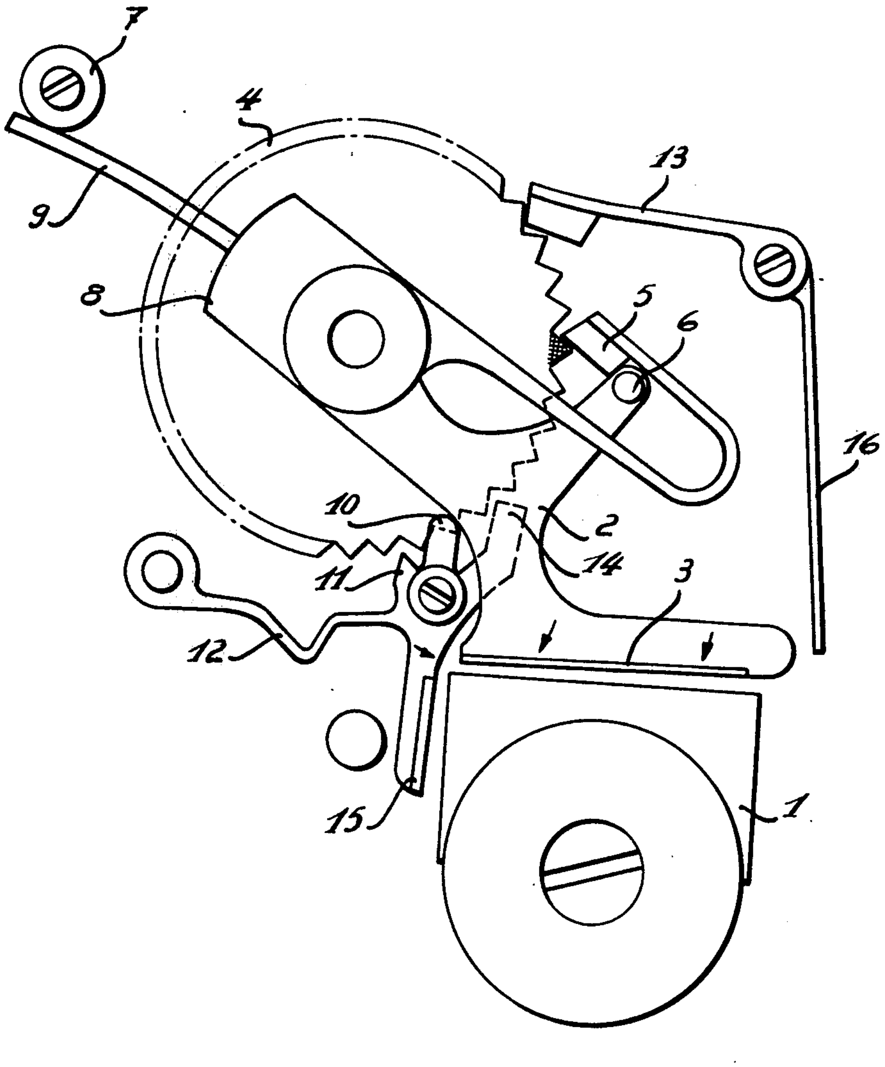
FIG. 3 shows a third embodiment of magneto-mechanical blockage, having a safety cam.

The magneto-mechanical locking system may be provided with a locking cam 10 seen in FIG. 3. When movement of the movable support 2 commences and the magnetic plates 3 and 15 are attracted by the pole pieces of 1 under the influence of the magnetic field, the movable support 2 activates the locking system by means of the locking cam 10. The magnetic plate of lever 15 then ensures the return movement and accelerates the rotation of the locking system. On the other hand, so as to ensure a good mechanical contact of lever 15 with the pole pieces of 1, the latter may be mounted on a flexible adapter in such a manner as to ensure the best planarity of the magnetic interface.

What I claim is:

1. Electromechanical escapement comprising an electromagnetic motor adapted to be controlled by an electric impulse of short duration, a toothed wheel, drive means for driving said toothed wheel in one direction, a magnetic member adapted to be moved by said electromagnetic motor upon actuation of said motor, a spring for storing and releasing the kinetic energy of movement of said magnetic member, said spring driving said drive means, indexing means for preventing movement of said wheel in a direction opposite the direction in which the wheel is driven by said drive means, locking means for preventing movement of said wheel in the direction in which said wheel is driven by said drive means except when said wheel is driven by said drive means, and means disabling said locking means when said drive means drives said wheel.

2. An escapement as claimed in claim 1, in which said means disabling said locking means comprises means responsive to movement of said drive means in a direction to drive said tooth.

3. An escapement as claimed in claim 2, in which said locking means comprises a locking pawl engageable with the teeth of the wheel to prevent movement of the wheel in the direction in which it is driven by the drive means, and means responsive to movement of the escapement in a direction to drive the wheel, to disengage said pawl from the wheel.

4. An escapement as claimed in claim 1, in which said locking means comprises an escapement having two pawls that alternately engage with spaced teeth on the wheel, one of said pawls being movable into engagement with the wheel under the influence of said motor and being movable by said wheel to a position in which the other said pawl engages a tooth of the wheel to prevent advance of the wheel by an increment of more than one tooth.

5. An escapement as claimed in claim 1, in which said locking means comprises an escapement having three pawls thereon, one of which engages the wheel to prevent forward movement of the wheel upon actuation of said motor, another of which engages said wheel to prevent forward movement of said wheel by an increment of more than one tooth on the wheel, and the third of which engages the teeth of the wheel upon forward movement of the wheel to disengage the first-mentioned pawl from the teeth of the wheel and to engage the second-mentioned pawl with the teeth of the wheel.

* * * * *